(12) United States Patent
Kada et al.

(10) Patent No.: US 10,294,419 B2
(45) Date of Patent: May 21, 2019

(54) CHARGED PARTICLE RADIATION MEASURING METHOD AND CHARGED PARTICLE RADIATION MEASURING DEVICE

(71) Applicants: National University Corporation Gunma University, Maebashi-shi, Gunma (JP); National Institutes For Quantum And Radiological Science And Technology, Chiba-shi, Chiba (JP); Denka Company Limited, Chuo-ku, Tokyo (JP)

(72) Inventors: Wataru Kada, Maebashi (JP); Kenta Miura, Maebashi (JP); Osamu Hanaizumi, Maebashi (JP); Tomihiro Kamiya, Takasaki (JP); Takahiro Satoh, Takasaki (JP); Junichi Susaki, Tokyo (JP); Suzuya Yamada, Machida (JP)

(73) Assignees: Denka Company Limited, Chuo-Ku, Tokyo (JP); National University Corporation Gunma University, Maebashi-Shi, Gunma (JP); National Institutes For Quantum And Radiological Science And Technology, Chiba-Shi, Chiba (JP)

( * ) Notice: Subject to any disclaimer, the term of this patent is extended or adjusted under 35 U.S.C. 154(b) by 0 days.

(21) Appl. No.: 15/756,160

(22) PCT Filed: Aug. 25, 2016

(86) PCT No.: PCT/JP2016/074813
§ 371 (c)(1),
(2) Date: Feb. 28, 2018

(87) PCT Pub. No.: WO2017/038622
PCT Pub. Date: Mar. 9, 2017

(65) Prior Publication Data
US 2018/0244990 A1    Aug. 30, 2018

(30) Foreign Application Priority Data
Aug. 28, 2015    (JP) .................... 2015-169363

(51) Int. Cl.
*C09K 11/64*    (2006.01)
*G01T 1/20*    (2006.01)
(Continued)

(52) U.S. Cl.
CPC .............. *C09K 11/64* (2013.01); *C09K 11/70* (2013.01); *C09K 11/7734* (2013.01); *G01T 1/20* (2013.01); *G01T 1/202* (2013.01); *G01T 1/2023* (2013.01)

(58) Field of Classification Search
CPC ........ C09K 11/64; C09K 11/70; G01T 1/2023
(Continued)

(56) References Cited

U.S. PATENT DOCUMENTS

2009/0284948 A1 * 11/2009 Yamao .................. C04B 35/597
                                                                        362/84
2010/0053932 A1 *  3/2010 Emoto .................. C04B 35/597
                                                                        362/84
(Continued)

FOREIGN PATENT DOCUMENTS

JP    2007-070496    3/2007
JP    2007-302757    11/2007
(Continued)

OTHER PUBLICATIONS

"English Translation of PCT International Search Report in PCT/JP2016/074813", dated Sep. 20, 2016, 2 pages.
(Continued)

*Primary Examiner* — David P Porta
*Assistant Examiner* — Gisselle M Gutierrez
(74) *Attorney, Agent, or Firm* — Servilla Whitney LLC

(57) ABSTRACT

[Problem] To provide highly heat-resistant and radiation-resistant radiation measuring equipment.
(Continued)

[Solution] Provided are a charged particle radiation measuring method and a charged particle radiation measuring device using a scintillator comprising a phosphor in which the main component is a SiAlON phosphor.

2 Claims, 3 Drawing Sheets

(51) Int. Cl.
*G01T 1/202* (2006.01)
*C09K 11/70* (2006.01)
*C09K 11/77* (2006.01)

(58) Field of Classification Search
USPC .................................................. 250/361 R
See application file for complete search history.

(56) References Cited

U.S. PATENT DOCUMENTS

| 2010/0237767 | A1* | 9/2010 | Emoto | C04B 35/597 |
| | | | | 313/503 |
| 2015/0001401 | A1* | 1/2015 | Ramsden | G01T 1/20 |
| | | | | 250/362 |
| 2016/0347997 | A1* | 12/2016 | Tchoul | C08G 77/52 |
| 2018/0068826 | A1* | 3/2018 | Kubo | H01J 37/222 |
| 2018/0097153 | A1* | 4/2018 | Iwata | H01L 33/504 |
| 2018/0135813 | A1* | 5/2018 | Yamakawa | C09K 11/08 |

FOREIGN PATENT DOCUMENTS

| JP | 2010-127862 | | 6/2010 |
| JP | 2015-111322 | | 6/2015 |
| WO | 2014/030637 | A1 | 2/2014 |
| WO | 2015/133612 | A1 | 11/2015 |

OTHER PUBLICATIONS

"PCT International Search Report in PCT/JP2016/074813", dated Sep. 20, 2016, 7 pages.

Kada, Wataru , et al., "Development of a New Scanning Ion Microbeam Analysis and Imaging Technique: Ion-Luminescence Microscopic Imaging and Spectroscopy (ILUMIS)", vol. 38, No. 3; 2013, 443-446.

Extended European Search Report in EP 16841654.3 dated Jan. 7, 2019, 7 pages.

Kargin, Yu. F., et al., "Synthesis and Cathodoluminescence Characteristics of Europium-Doped Ca-Sialons", Inorganic Materials, vol. 48, No. 8, 2012, pp. 827-831.

* cited by examiner

[Fig. 1]
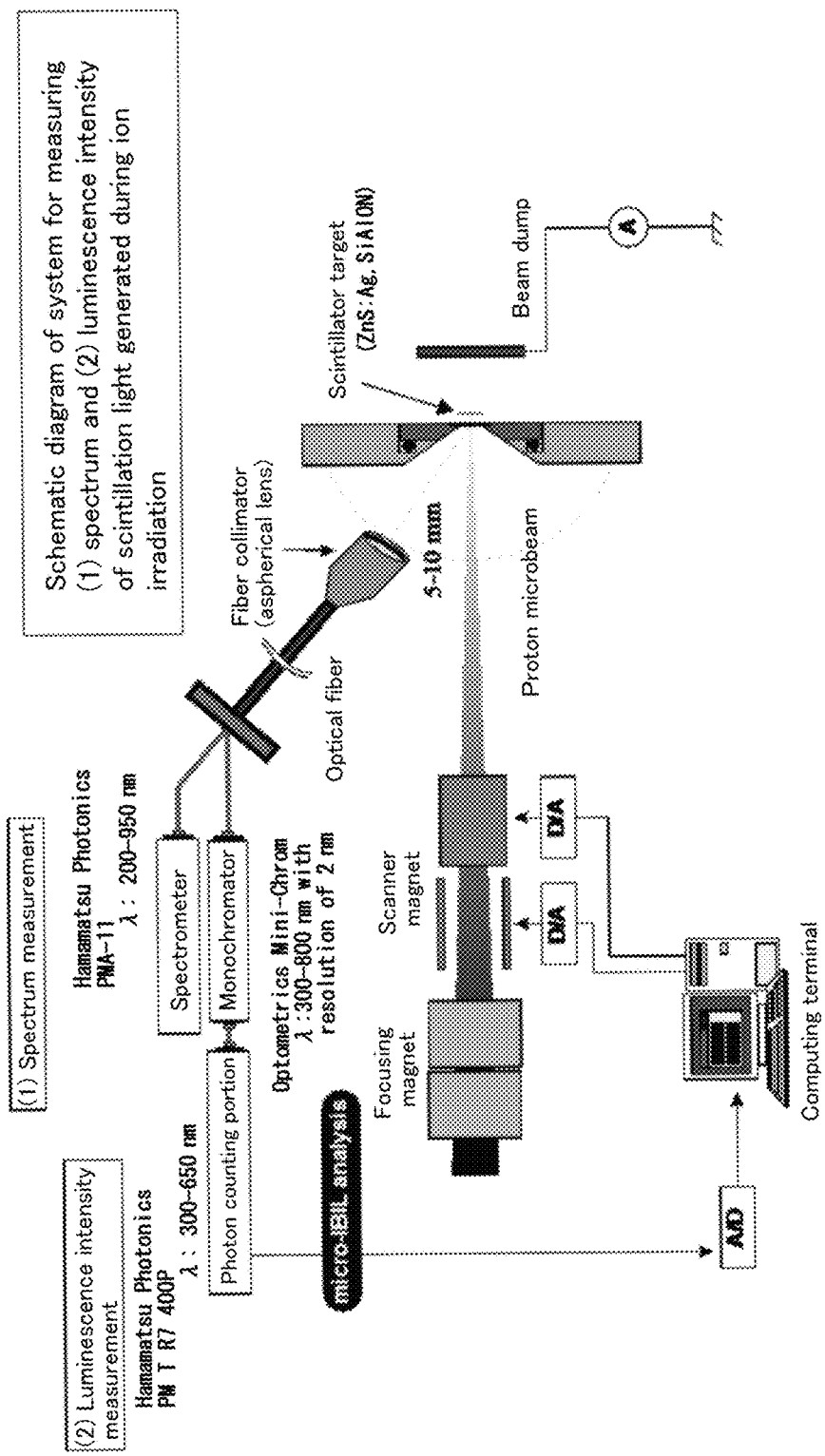

[Fig. 2]
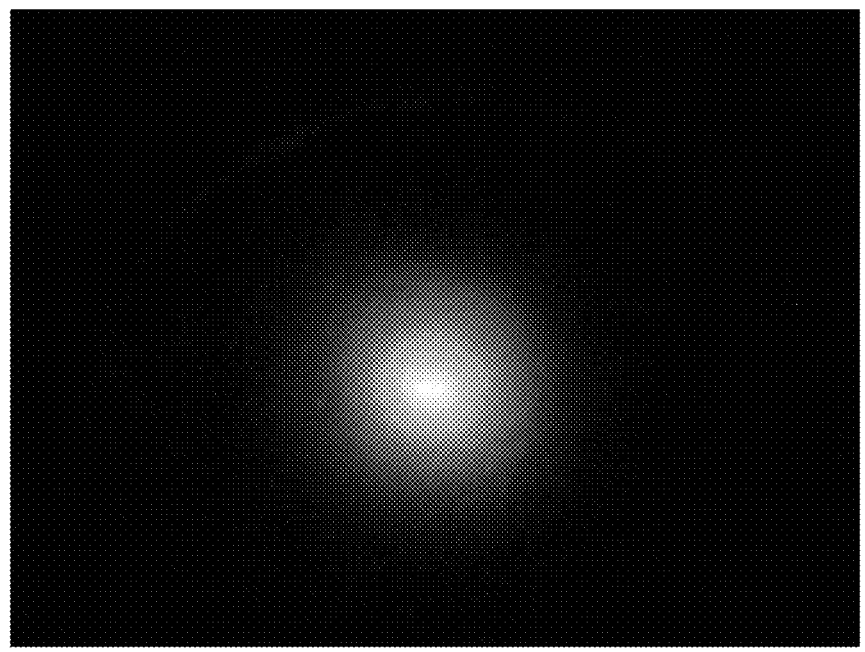
[Fig. 3]
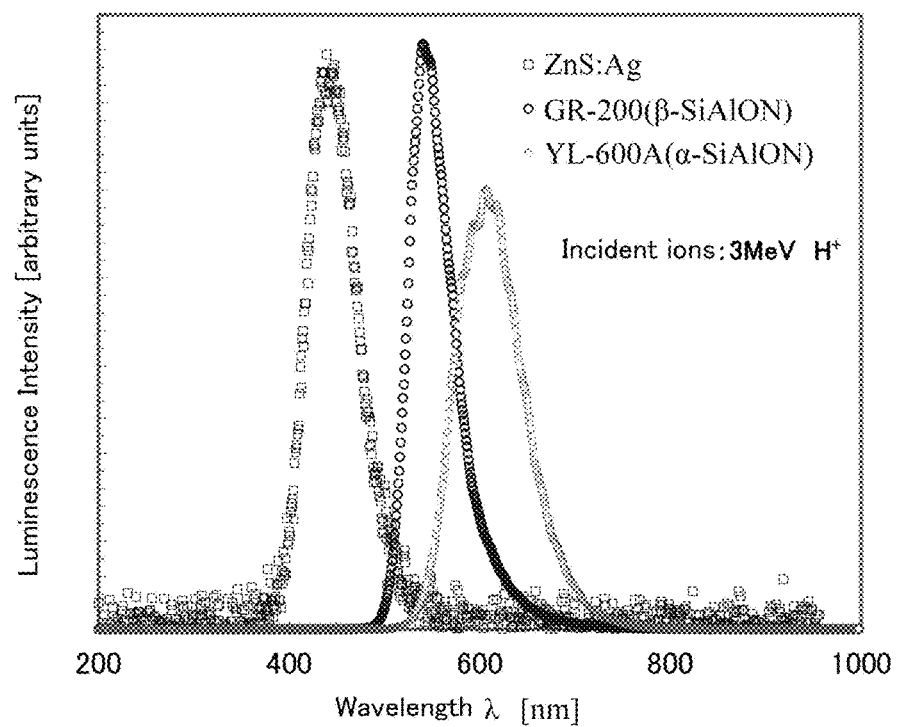

[Fig. 4]
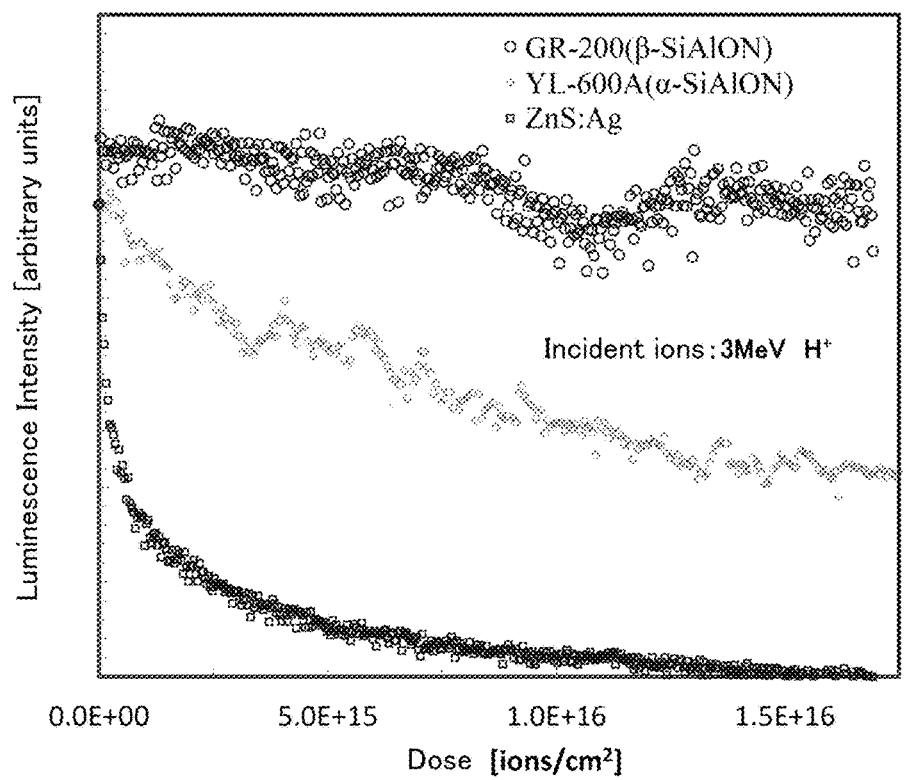

CHARGED PARTICLE RADIATION MEASURING METHOD AND CHARGED PARTICLE RADIATION MEASURING DEVICE

TECHNICAL FIELD

The present invention relates to a charged particle radiation measuring method and a charged particle radiation measuring device.

BACKGROUND ART

Advanced medicine using radiation-generating devices, such as heavy-particle therapy devices, and fundamental testing at accelerator facilities associated therewith require the precise and continuous measurement of the radiation doses and energies of charged particles under high radiation density conditions. In addition thereto, in the event of accidents at nuclear power facilities such as nuclear power plants or the like that make use of nuclear fission, as well as in the reactor environments inside nuclear fusion reactors, the development of which has progressed in recent years, radiation measuring equipment must be installed in high-temperature, high-environmental-load and high-radiation environments in order to take measurements.

The ion beams generated by accelerator facilities and the radiation from nuclear power facilities is generally of high density, and in charged particle-irradiated environments in which the surrounding environment is also at a high temperature, most radiation measuring equipment must be highly reliable.

When taking such measurements, scintillation-type detectors using scintillators are used, and the durability and luminous efficiency of the luminescent material parts that convert radiation to light are extremely important. Scintillators are substances that generate light when radiation impinges thereon, and they are used in positron emission tomography (PET) devices and in industrial applications as well as in the aforementioned radiation measurement applications and in accelerator facilities such as those used in heavy-particle therapy. In current α-ray measuring equipment, materials such as ZnS:Ag,Cu and the like are widely used for the luminous efficiency thereof (see Patent Document 1, Patent Document 2 or Non-Patent Document 1).

However, the scintillator materials such as ZnS:Ag,Cu that are currently used are not recommended for use at a temperature range of approximately 100° C. or higher. For this reason, the properties of the materials are not suitable for radiation measurement in nuclear power facilities, for which they would be expected to be used in high-temperature environments.

Moreover, ZnS:Ag,Cu and the like have the problem that the luminous intensities thereof are significantly degraded by high-density radiation, and thus, they require frequent replacement.

RELATED ART DOCUMENTS

Patent Documents

Patent Document 1: JP 2007-70496 A
Patent Document 2: JP 2010-127862 A

Non-Patent Documents

Non-Patent Document 1: *Transactions of the Materials Research Society of Japan*, Vol. 38, No. 3, 2013, pp. 443-446.

SUMMARY OF THE INVENTION

Problems to be Solved by the Invention

The degradation caused by radiation at nuclear power facilities adversely affects the dose measurements of said radiation, and poses a problem for reliability. Additionally, high-density charged particle irradiation is also to be expected in accelerator facilities and in medical installations such as heavy-particle therapy facilities making use thereof. There are still problems that need to be addressed in radiation measuring equipment making use of existing scintillators, such as the problem of ensuring high performance in the beam quality of such equipment and in that the decrease in work efficiency due to replacement procedures significantly inhibits the operating efficiency of accelerator devices.

With the existing scintillator materials (ZnS:Ag,Cu) that are widely used in conventional scintillator-type charged particle (α-ray) detectors, prolonged installment in high-temperature environments exceeding one hundred and a few tens of degrees (° C.) resulted in problems such as not being able to precisely measure the doses of the charged particles over long periods of time, and even for the measured doses, not being able to take precise measurements thereof.

Meanwhile, in beam monitor measurement applications for charged particle beams generated by accelerator facilities or the like, high-density ion currents are to be expected. With existing scintillator materials (ZnS:Ag,Cu), there is significant attenuation in the light output, and replacement becomes necessary, for example, when the cumulative number of ions exceeds $10^{15}$ per square cm (hereinafter expressed as $10^{15}$ [ions/cm$^2$]). Additionally, even for measurements before that number is reached, it is necessary to account for the degradation in the luminous efficiency in order to determine the radiation dose from the light output, so precise measurements cannot be made.

These problems are relevant to the fields of fundamental and applied physics relating to radiation measuring equipment for measuring α-rays in nuclear power facilities, advanced medical device installations making use of radiation generating devices such as heavy-particle therapy devices, and other accelerator facilities associated with the use of charged particles, as well as to the field of industrial equipment having compact accelerator mechanisms such as ion implantation devices.

The present invention was made in consideration of the above-described background, and has the purpose of providing highly heat-resistant and radiation-resistant radiation measuring equipment.

Means for Solving the Problems

The present invention provides a charged particle radiation measuring method using a scintillator comprising a phosphor in which the main component is a SiAlON phosphor.

The present invention provides a charged particle radiation measuring device comprising a scintillator comprising a phosphor in which the main component is a SiAlON phosphor; an optical component that selectively collects light from the scintillator; and a measuring portion that reads out light induced by radiation.

In one embodiment of the present invention, the above-mentioned SiAlON phosphor is a phosphor in which the main component is a β-type SiAlON represented by the general formula: $Eu_xSi_{6-z}Al_zO_zN_{8-z}$, where $0.01 \le x \le 0.5$ and $0 < z \le 4.2$, and having an Eu luminescence center.

In one embodiment of the present invention, the above-mentioned SiAlON phosphor is a phosphor in which the main component is an α-type SiAlON represented by the general formula: $M_ySi_{12-(m+n)}Al_{(m+n)}O_nN_{16-n}$, where M includes at least one element chosen from among Li, Ca, Mg, Y and lanthanides, with the exception of La and Ce, and at least one luminescence center chosen from among Eu, Ce, Tb, Yb, Sm, Dy, Er and Pr, where $y=m/p$, in which p is the valence of M, and where $0.3 < m < 4.5$ and $0 \le n < 2.5$.

Effects of the Invention

According to the present invention, highly heat-resistant and radiation-resistant radiation measuring equipment can be provided.

BRIEF DESCRIPTION OF THE DRAWINGS

FIG. 1 is a schematic structural diagram of a radiation dose measuring device according to one embodiment of the present invention.

FIG. 2 is an example of beam measurement in a radiation dose measuring device according to an example.

FIG. 3 is an example of wavelength measurement in a radiation dose measuring device according to an example.

FIG. 4 is an example wherein the radiation resistance of a radiation dose measuring device was tested by means of high-density radiation.

MODES FOR CARRYING OUT THE INVENTION

Hereinbelow, embodiments of the charged particle radiation measuring method and the charged particle radiation measuring device according to the present invention will be explained with reference to the attached drawings. However, it should be clear that the present invention is not limited to these embodiments.

The charged particle radiation measuring method and the charged particle radiation measuring device according to the present embodiment use, as scintillator materials, phosphors in which the main component is a SiAlON phosphor.

SiAlON phosphors are representative oxynitride phosphors. They are phosphors having luminescence centers that are activated by using, as the host crystal, SiAlON, which was developed as an engineering ceramic that maintains good mechanical properties at high temperatures. There are two types that differ in their crystal structures.

β-type SiAlON is a green-emitting phosphor represented by the general formula: $Eu_xSi_{6-z}Al_zO_zN_{8-z}$, where $0.01 \le x \le 0.5$ and $0 < z \le 4.2$, and having an Eu luminescence center.

α-type SiAlON is a phosphor represented by the general formula: $M_ySi_{12(m+n)}Al_{(m+n)}O_nN_{16-n}$, where M includes at least one element chosen from among Li, Ca, Mg, Y and lanthanides, with the exception of La and Ce, and at least one luminescence center chosen from among Eu, Ce, Tb, Yb, Sm, Dy, Er and Pr, where $y=m/p$, in which p is the valence of M, and where $0.3 < m < 4.5$ and $0 \le n < 2.5$.

It is known that when these SiAlON phosphors are used as phosphors in white LED devices in which luminescence occurs by excitation with blue light from a blue LED chip, the luminescence intensity is not reduced by much even if the environmental temperature rises to 300° C., and degradation is not observed even when the phosphors are left in a high-temperature, humidity-resistant (85° C., 85% relative humidity) environment.

The present inventors discovered that SiAlON phosphors have extremely low susceptibility to degradation in high-temperature environments and by irradiation with high-density radiation compared with existing scintillator materials such as ZnS:Ag,Cu phosphors and the like.

In the radiation measuring equipment according to the present embodiment, the luminescence spectrum of light induced by radiation in the highly heat-resistant and radiation-resistant SiAlON phosphor is preferably adjusted so that the peak wavelength is a wavelength at which a light sensor has high quantum efficiency.

The charged particle radiation measuring device according to the present embodiment comprises a scintillator comprising a phosphor in which the main component is a SiAlON phosphor; an optical component that selectively collects light from the scintillator; and a measuring portion that reads out light induced by radiation.

The radiation measuring equipment according to the present embodiment may be formed by combining a mechanical component, such as a holder that holds and fixes the SiAlON phosphor, in a form such as a powder, a sintered compact, a single crystal or a thin film; an optical component that selectively collects the radiation-induced light from the scintillator; and a measuring portion, such as camera equipment, an avalanche photodiode (APD), a photomultiplier tube (PMT), a CCD element or a photodiode (PD), that reads the photons induced by primary radiation.

FIG. 1 is an example of a schematic structural diagram showing radiation measuring equipment. The radiation from an accelerator facility is used as the primary radiation.

The emission wavelength can be adjusted by changing the composition of the SiAlON phosphor constituting the scintillator, thereby improving the readout efficiency in the measuring equipment.

For α-rays in environmental radiation or the like, the radiation source is not a single point, but rather arrives from all directions so as to surround the scintillator material. The scintillator material and the mechanical component, optical component and measuring portion associated therewith may be configured in the same manner as that shown in FIG. 1. Additionally, since the mechanical component, the optical component and the measuring portion must have a geometric structure and arrangement that are suitable for the measurement target, the structures thereof may take various forms depending on the purpose. By using one-dimensional or two-dimensional measuring equipment in the measuring portion, the mode of observation may be changed.

According to the present invention, charged particle measurements can be made in high-temperature, high-load environments, even for measuring radiation from radiation sources other than radiation generating devices, using basically the same structural elements, though the structure of the radiation measuring equipment will differ.

Although the heat-resistance performance of the components used in the measuring equipment could raise problems, structural changes cannot occur in the SiAlON phosphor even at high temperatures. Thus, by combining the SiAlON phosphor with structural materials as well as an optical component and a measuring portion that are appropriate, it is possible to improve the operating temperature range of the radiation measuring equipment, which has higher radiation resistance than conventional devices. As a result thereof, it is possible to prolong the life spans of α-ray measuring equipment having the purpose of performing normal radioactive contamination tests, and to realize and provide radiation measuring equipment for measuring α-rays inside nuclear power facilities or the like, where high-temperature resistance is required.

The charged particle radiation measuring method and the charged particle radiation measuring device according to the present embodiment may be used as a) radiation measuring equipment for measuring α-rays, used in nuclear power facilities, that take measurements by means of scintillation; b) beam monitors and radiation meters that are used for measuring beam quality in radiation generating devices (accelerators) in heavy-particle or cation therapy devices; or c) beam quality measuring devices or the like in other accelerator facilities that are associated with the use of charged particles, or in industrial equipment having compact accelerator mechanisms such as industrial ion implantation devices.

In the charged particle radiation measuring device according to the present embodiment, by using a phosphor in which the main component is a SiAlON phosphor as a novel scintillator material, which is a radiation/light conversion material, it is possible to provide a highly heat-resistant and radiation-resistant radiation measuring device that comprises the scintillator material, a mechanical component that holds and fixes the scintillator material and an optical component that selectively collects light from the scintillator, and a measuring portion that reads out radiation-induced light.

As described above, due to the charged particle radiation measuring method and the charged particle radiation measuring device according to the present embodiment, it is possible to provide a radiation meter that can measure charged particle radiation doses regardless of the environment, and that can be used for a longer life span than conventional devices, even under conditions in which the temperature is in the hundreds of degrees (° C.) or at high radiation doses such as in focused charged particle irradiated environments in which it was conventionally difficult to use charged particle radiation meters.

EXAMPLES

Hereinbelow, examples of the present invention will be described.

Example 1

A β-type SiAlON:Eu powder (manufactured by Denka, GR-200 grade, β-type SiAlON, average particle size: 21 μm) was dispersed in water glass, then coated onto and evenly fixed to a carbon plate, to a coating film thickness of 10 μm or less, to produce a scintillator. This scintillator was mounted on radiation measuring equipment as shown in FIG. 1, and a charged particle irradiation test was performed thereon.

From an adjacent accelerator facility, a 3 MeV H$^+$ (proton) focused ion beam was directed so as to continuously irradiate a localized (400 μm×400 μm) target.

With the radiation measuring equipment of the present invention, it is possible to measure the distribution and intensity of the primary radiation by means of the spatial distribution or wavelength distribution of light. FIG. 2 shows an example of beam measurement using the radiation measuring equipment. FIG. 3 shows the results of measurement of the spectrum and luminescence intensity of light generated by excitation by charged particles.

Example 2

Using an α-type SiAlON:Eu powder (manufactured by Denka, YL-600A grade, α-type SiAlON, average particle size: 15 μm), a scintillator was produced using the same method as that in Example 1, and a charged particle irradiation test was performed thereon.

Comparative Example 1

As Comparative Example 1, charged particle irradiation tests were performed under the same conditions as those in Example 1, but using a ZnS:Ag phosphor powder instead of the above-mentioned α-type SiAlON:Eu powder.

FIG. 3 shows measurement results for the spectra and luminescence intensities of Examples 1 and 2 and Comparative Example 1 at the time of commencement of the tests. When exposed to the same radiation dose, at the time of commencement of the tests, charged-particle-excited luminescence of about the same luminescence intensity as that in Comparative Example 1 using ZnS:Ag was observed, at slightly longer wavelengths, in Example 1 using the α-type SiAlON:Eu phosphor. The luminescence wavelength of the β-type SiAlON:Eu phosphor was more favorable in that the quantum efficiency of the optical sensor was higher at that wavelength as compared to the luminescence wavelength of ZnS:Ag.

Additionally, in Example 2 using α-type SiAlON, charged-particle-excited luminescence was observed at longer wavelengths than in β-type SiAlON. The luminescence intensity for α-type SiAlON was lower than that for β-type SiAlON, but about the same value was obtained when integrating the luminescence intensity over the luminescence spectrum.

FIG. 4 shows the results of high-density irradiation tests of radiation measuring equipment using Examples 1 and 2, and Comparative Example 1. The charged particle doses are indicated on the horizontal axis and the luminescence intensities at the same radiation intensities are shown on the vertical axis.

It can be seen that, as the charged particle dose increases, the luminescence intensity of Comparative Example 1, which uses ZnS:Ag, attenuates significantly. In contrast thereto, in the case of Example 1, which uses a β-type SiAlON:Eu phosphor, attenuation of the luminescence intensity is not observed, and it can be confirmed that the fluorescence properties are not degraded by high-density radiation. In Example 2, which uses an α-type SiAlON:Eu phosphor, attenuation of the luminescence intensity was observed, but it can be seen that the attenuation was small in comparison to Comparative Example 1, which uses ZnS:Ag.

From the above results, it can be understood that the charged particle radiation measuring method using a SiAlON phosphor according to the present invention is fully capable of being used in a highly heat-resistant and radiation-resistant radiation meter. As a result thereof, measurements of radiation intensity and dose based on luminescence intensity can be made for a long period of time by using the output from the measuring portion of the radiation meter, which utilizes a SiAlON phosphor.

Furthermore, as shown in FIG. 2, it is possible to measure a beam spot in two dimensions, and to measure the distribution of the primary radiation.

In the present example, the radiation source is radiation from an accelerator facility, so the test is a highly accelerated test in which the measurement time is only about a few hours. However, for α-rays in environmental radiation or the like, such numbers mean that the device would be highly resistant even to degradation on the order of years. Additionally, since the fluorescence properties of SiAlON are maintained even under conditions in which charged particles are continually heated in a localized area, the present invention can be used even in high-temperature environments of hundreds of degrees (° C.).

The invention claimed is:

1. A charged particle radiation measuring method utilizing a scintillator comprising a phosphor in which the main component is a SiAlON phosphor, wherein the SiAlON phosphor is a phosphor in which the main component is a β-type SiAlON represented by the general formula: $Eu_xSi_{6-z}Al_zO_zN_{8-z}$, where $0.01 \leq x \leq 0.5$ and $0 < z \leq 4.2$, and having an Eu luminescence center.

2. A charged particle radiation measuring device comprising: a scintillator comprising a phosphor in which the main component is a SiAlON phosphor; an optical component that selectively collects light from the scintillator; and a measuring portion that reads out light generated by radiation, wherein the SiAlON phosphor is a phosphor in which the main component is a β-type SiAlON represented by the general formula: $Eu_xSi_{6-z}Al_zO_zN_{8-z}$, where $0.01 \leq x \leq 0.5$ and $0 < z \leq 4.2$, and having an Eu luminescence center.

* * * * *